(12) United States Patent
Kawanaka et al.

(10) Patent No.: US 9,650,491 B2
(45) Date of Patent: May 16, 2017

(54) EPOXY RESIN COMPOSITION, AND METHOD FOR PRODUCING THE SAME

(71) Applicants: FUJI CHEMICAL COMPANY, LIMITED, Osaka-shi, Osaka (JP); KYOCERA Corporation, Kyoto-shi, Kyoto (JP)

(72) Inventors: Satoshi Kawanaka, Hirakata (JP); Fumio Uchida, Daito (JP); Yuji Nakano, Kameoka (JP); Yoshiyuki Kawasumi, Osaka (JP)

(73) Assignees: FUJI CHEMICAL COMPANY, LIMITED, Osaka (JP); KYOCERA CORPORATION, Kyoto (JP)

( * ) Notice: Subject to any disclaimer, the term of this patent is extended or adjusted under 35 U.S.C. 154(b) by 168 days.

(21) Appl. No.: 14/349,469

(22) PCT Filed: Oct. 1, 2012

(86) PCT No.: PCT/JP2012/075346
§ 371 (c)(1),
(2) Date: Apr. 3, 2014

(87) PCT Pub. No.: WO2013/051497
PCT Pub. Date: Apr. 11, 2013

(65) Prior Publication Data
US 2014/0275344 A1    Sep. 18, 2014

(30) Foreign Application Priority Data
Oct. 3, 2011    (JP) .................... 2011-219572

(51) Int. Cl.
*C08K 3/36*    (2006.01)
*C08L 63/00*    (2006.01)
(Continued)

(52) U.S. Cl.
CPC ............ *C08K 3/36* (2013.01); *C08G 59/4215* (2013.01); *C08K 5/1565* (2013.01); *C08L 63/00* (2013.01); *G02B 1/04* (2013.01); *C08K 2201/003* (2013.01)

(58) Field of Classification Search
CPC .................................. C08L 63/00; C08K 3/36
See application file for complete search history.

(56) References Cited

U.S. PATENT DOCUMENTS 3,069,375 A * 12/1962 Storrow .................... C08F 8/44
524/493
6,165,699 A * 12/2000 Bauer ...................... G03C 1/93
427/386
(Continued)

FOREIGN PATENT DOCUMENTS

JP    2000-109712 A    4/2000
JP    2006-247915 A    9/2006
(Continued)

OTHER PUBLICATIONS

English machine translation of JP 2009-228003, printed Dec. 22, 2015.*
(Continued)

*Primary Examiner* — Megan McCulley
(74) *Attorney, Agent, or Firm* — Volpe and Koenig, P.C.

(57) ABSTRACT

An epoxy resin composition is provided which includes a polycrystalline structure comprised of a plurality of monocrystalline structures. The plurality of monocrystalline structures are respectively comprised of a plurality of silicon oxide colloidal particles regularly aligned in epoxy resin. The plurality of silicon oxide colloidal particles are not contacted with each other. The mean distance between the silicon oxide colloidal particles adjacent to each other is less than 330 nm. The mean particle size of the plurality of silicon oxide colloidal particles is less than 290 nm. The (Continued)

concentration of the plurality of silicon oxide colloidal particles is 10-50% by mass. A relative permittivity of 4 or more is ensured. A method for producing the epoxy resin composition is provided. Building materials, ornaments and optical materials, each using the epoxy resin composition, are also provided.

12 Claims, 3 Drawing Sheets

(51) Int. Cl.
  *G02B 1/04*  (2006.01)
  *C08K 5/1565*  (2006.01)
  *C08G 59/42*  (2006.01)

(56) References Cited

U.S. PATENT DOCUMENTS 9,023,961 B2 * 5/2015 Yamanaka ............... C08L 33/12
                    522/71

2007/0238804 A1 * 10/2007 Ho ...................... A61K 6/0017
                    522/77
2008/0305968 A1  12/2008 Nakamura et al.

FOREIGN PATENT DOCUMENTS

JP  2008-303261 A  12/2008
JP  2009-228003 A  10/2009
JP  2011-001492 A  1/2011
JP  2011-046888 A  3/2011
JP  2012-180388 A  9/2012
WO  03/100139 A1  12/2003
WO  WO 03100139 A1 * 12/2003 ............... C30B 5/00

OTHER PUBLICATIONS

English machine translation of JP 2011-001492, printed Dec. 22, 2015.*
International Search Report, PCT/JP2012/075346, Dec. 17, 2012, 2 pgs.

* cited by examiner

EPOXY RESIN COMPOSITION, AND METHOD FOR PRODUCING THE SAME

FIELD OF INVENTION

The present invention relates to an epoxy resin composition and a method for producing the same, as well as to building materials, ornaments, and optical materials, each produced using the epoxy resin composition.

BACKGROUND

Conventionally, immobilized colloidal crystals have been known in which colloidal particles are regularly aligned while avoiding substantial contact between the colloidal particles adjacent to each other by dispersing the colloidal particles in a solvent containing a polymerizable material so as to polymerize the polymerizable material (for example, refer to Patent Document 1).

Patent Document 1 describes an immobilized colloidal crystal in which a polycrystalline substance of colloidal particles comprised of silica composite particles having a particle size of 136 nm is immobilized by polymer chain repellence by blending the silica composite particles with ethylene dimethacrylate and methyl methacrylate.

However, with the immobilized colloidal crystal described in Patent Document 1, the peak wavelength of a reflection spectrum is about 530 nm, thus failing to exhibit optional play of color from a wide wavelength range from violet to red (400-800 nm).

There is also a method in which colloidal particles comprised of particulates of silicon oxide or the like are packed in liquid, such as water, by closest packing method (for example, refer to Patent Document 2). Patent Document 2 describes that the colloidal particles can be subjected to closest packing in a short time by irradiating ultrasonic waves to the liquid containing the particulates.

However, with the method described in Patent Document 2, it is necessary to evaporate or volatilize the liquid by the ultrasonic waves, and the colloidal particles are not necessarily subjected to the closest packing in the short time depending on the concentration and composition of the liquid. Therefore, the method described in Patent Document 2 has the problems in terms of mass production and costs. The method described in Patent Document 2 also has the problem in terms of processability because a high content of silicon oxide results in hardness that is high for processing.

There is also a method including polymerizing a monomer having colloidal particles dispersed therein so as to produce a colloidal crystal immobilized with a polymer (for example, refer to Patent Document 3).

However, the method described in Patent Document 3 is merely configured to constitute the colloidal crystal with a polycrystalline substance containing a large number of monocrystalline substances, and is not configured to intentionally control the size of the monocrystalline substances. Therefore, with the method described in Patent Document 3, the obtainable colloidal crystal may not exhibit sufficient play of color. Here, the phrase "play of color" denotes a hue change with a change in viewing angle, which is observable, for example, in opal as a jewelry. One of reasons why the play of color is observable seems due to that various crystal surfaces are observable in the polycrystalline substance owing to the large number of monocrystalline substances. When the size of the monocrystalline substances is not intentionally controlled, there is a risk that the polycrystalline substance is comprised of small monocrystalline substances. When the size of the monocrystalline substances is too small, the visibility of the polycrystalline substance is lowered, failing to exhibit the sufficient play of color. The colloidal crystal not exhibiting the sufficient play of color is unsuitable for building materials, ornaments, optical materials, or the like.

RELATED ART DOCUMENTS

Patent Documents

Patent Document 1: International Publication No. WO 2003/100139
Patent Document 2: Japanese Unexamined Patent Publication No. 2006-247915
Patent Document 3: Japanese Unexamined Patent Publication No. 2008-303261

SUMMARY

Problems to be Solved by Invention

An object of the present invention is to provide an epoxy resin composition which is capable of exhibiting optional play of color from a wide wavelength range from violet to red, and which is also relatively easy to produce, and also provide a method for producing the epoxy resin composition, as well as building materials, ornaments, and optical materials, each using the epoxy resin composition.

Means for Solving the Problems

An epoxy resin composition according to the present invention is comprised of a polycrystalline structure comprised of a plurality of monocrystalline structures. The plurality of monocrystalline structures are respectively comprised of a plurality of silicon oxide colloidal particles regularly aligned in epoxy resin. The plurality of silicon oxide colloidal particles are not contacted with each other. The mean distance between the silicon oxide colloidal particles adjacent to each other is less than 330 nm. The mean particle size of the plurality of silicon oxide colloidal particles is less than 290 nm. The concentration of the plurality of silicon oxide colloidal particles is 10-50% by mass. A relative permittivity of 4 or more is ensured.

A method for producing an epoxy resin composition according to the present invention includes a first step and a second step. The first step includes mixing at least one of a diglycidyl ester derivative compound and a diglycidyl ether derivative compound, and a phthalic anhydride derivative compound so as to obtain a blended material having a relative permittivity of 4 or more, and adding silicon oxide colloidal particles having a mean particle size of less than 290 nm to the blended material so as to obtain a precursor in which the concentration of the silicon oxide colloidal particles is 10-50% by mass. The second step includes heating the precursor to obtain an epoxy resin composition in which the plurality of silicon oxide colloidal particles are not contacted with each other, and in which the mean distance between the silicon oxide colloidal particles adjacent to each other is less than 330 nm.

A building material according to the present invention uses the foregoing epoxy resin composition.

An ornament according to the present invention uses the foregoing epoxy resin composition.

An optical material according to the present invention uses the foregoing epoxy resin composition.

Effect of the Invention

With the present invention, it is ensured to set a wide range of the content of silicon oxide that permits the formation of the monocrystalline structures constituting the polycrystalline structure. Therefore, it is ensured to set a wide wavelength range for the play of color that depends on the content of the silicon oxide. It is also ensured to reduce the content of the silicon oxide, thus being advantageous in terms of costs. Furthermore, the size of the monocrystalline structures constituting the polycrystalline structure is intentionally controlled, thereby enhancing the visibility of the polycrystalline structure to exhibit the sufficient play of color.

Further, with the present invention, it is ensured that the mean distance between the silicon oxide colloidal particles adjacent to each other is set in the wide range of less than 330 nm, thereby exhibiting the optional play of color from the wide wavelength range from violet to red. Furthermore, the epoxy resin composition of the present invention is comprised of the polycrystalline structure comprised of the plurality of monocrystalline structures. The plurality of monocrystalline structures are respectively comprised of the plurality of silicon oxide colloidal particles regularly aligned in the epoxy resin. Accordingly, the epoxy resin composition can be efficiently produced in a relatively short term of about 1-3 days without the problems involved in the conventional closest packing method including evaporating or volatilizing the liquid by the ultrasonic waves. This is advantageous in terms of costs, and is excellent in mass production.

The building material, ornament and optical material according to the present invention are respectively produced using the epoxy resin composition of the present invention, thus having the satisfactorily play of color.

BRIEF DESCRIPTION OF THE DRAWINGS

FIG. 2(*a*) is a scanning electron microscope (SEM) photograph of the epoxy resin composition in sample No. 14 as an example, FIG. 2(*b*) is a schematic explanatory drawing of FIG. 2(*a*); and FIG. 3(*a*) is a reflection spectrum of the epoxy resin composition in sample No. 13 as an example, and FIG. 3(*b*) is a reflection spectrum of the epoxy resin composition in sample No. 14 as an example.

DETAILED DESCRIPTION OF THE PREFERRED EMBODIMENTS

An epoxy resin composition according to one embodiment of the present invention is described in detail below with reference to FIGS. 1 to 3.

Figure 1:
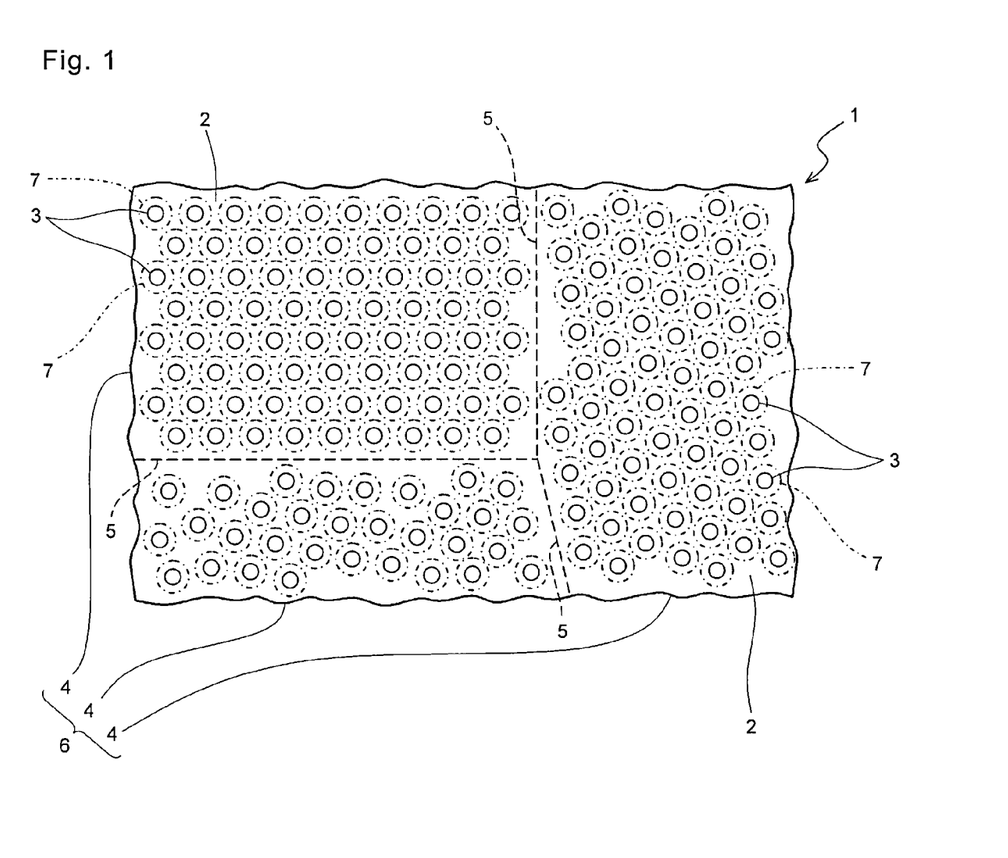
FIG. 1 is a partially enlarged schematic explanatory drawing showing an epoxy resin composition according to one embodiment of the present invention.
Figure 2A:
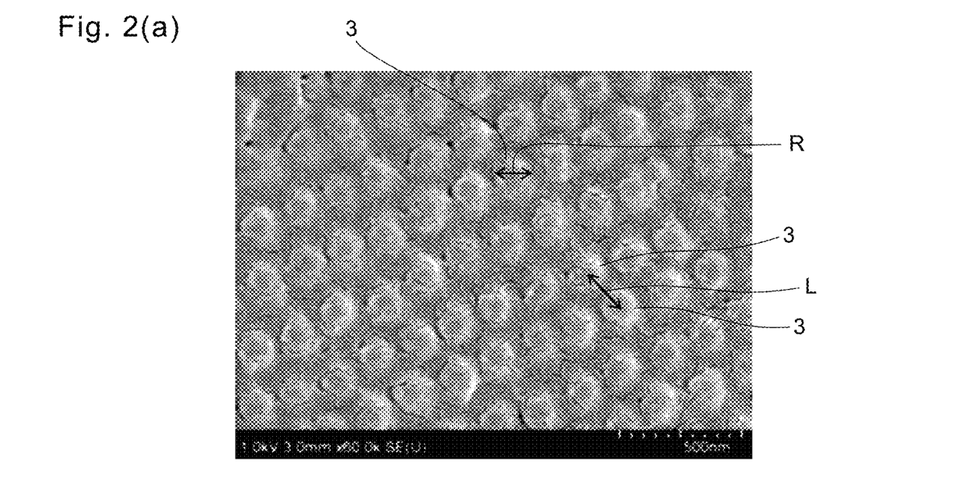
Figure 2B:
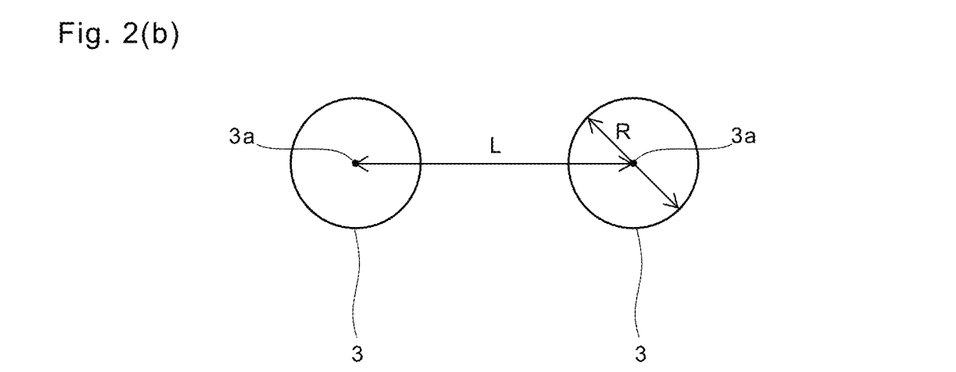

As shown in FIG. 1, the epoxy resin composition 1 of the present embodiment is one including a polycrystalline structure 6 comprised of a plurality of monocrystalline structures 4 that are respectively formed by regularly aligning a plurality of silicon oxide colloidal particles (hereinafter sometimes referred to as "colloidal particles") 3 in an epoxy resin 2.

In other words, the epoxy resin composition 1 of the present embodiment includes in the epoxy resin 2 the polycrystalline structure 6 of the colloidal particles 3. The polycrystalline structure 6 is comprised of the large number of monocrystalline structures 4. The monocrystalline structures 4 and 4 adjacent to each other differ from each other along their boundary line 5 in the orientation of the colloidal particles 3 constituting each of the monocrystalline structures 4. The colloidal particles 3 and 3 adjacent to each other repel each other by an electrostatic force 7, and hence are not contacted with each other. Individual configurations of the epoxy resin composition 1 of the present embodiment are specifically described below.

The epoxy resin 2 of the present embodiment is obtained by curing a blended material that is a mixture of a compound having a glycidyl group, an acid anhydride, and a high relative permittivity compound. The blended material is preferably liquid at room temperature. The phrase "room temperature" denotes temperatures of 15-30° C. When the blended material is liquid at room temperature, it is easy to disperse the colloidal particles 3.

The compound having the glycidyl group and the acid anhydride are used in such a proportion as usually set by those skilled in the art so that both can be reacted in just proportion during curing reaction. Although the proportion of these is changed depending on the compound having the glycidyl group to be used or the acid anhydride to be used, the acid anhydride is preferably 70-200 parts by mass, more preferably 90-110 parts by mass to 100 parts by mass of the compound having the glycidyl group. Each of the compound having the glycidyl group and the acid anhydride may be used solely or in combination of a plurality of kinds thereof.

There is a tendency to stably enhance the relative permittivity by blending so that the acid anhydride is excessive to the compound having the glycidyl group. Specific examples thereof include blending 55 parts by mass of the acid anhydride to 45 mass parts of the compound having the glycidyl group.

The relative permittivity of the blended material of the present embodiment is 4 or more. When the relative permittivity is less than 4, the electrostatic force 7 is insufficient and the electrostatic repulsion between the colloidal particles 3 and 3 adjacent to each other is weak. Consequently, the colloidal particles 3 are not regularly aligned, thus failing to exhibit the sufficient play of color. The relative permittivity of the blended material is preferably 10 or less. The relative permittivity is measurable by, for example, a high-precision impedance/LCR meter "6430B" manufactured by Wayne Kerr Electronics.

The blended material of the present embodiment is subjected to adjustment of the relative permittivity by adding a high relative permittivity compound. This ensures simple adjustment of the relative permittivity in the blended material. Here, the phrase "high relative permittivity compound" denotes the compound having a relative permittivity of 20 or more, preferably 60 or more. The high relative permittivity compound is preferably blended in a proportion of 1-6 parts by mass, more preferably 3-6 parts by mass to 100 parts by mass of the compound having the glycidyl group. The high relative permittivity compound may be used singly or in combination of a plurality of kinds thereof.

The way of adjusting the relative permittivity in the blended material is not limited to the addition of the high relative permittivity compound, but another way may be employed as long as the relative permittivity of the blended material can be controlled to 4 or more. Examples of the another way of adjusting the relative permittivity include a way of increasing a mixing ratio of one of the compound having the glycidyl group and the acid anhydride, which has a higher relative permittivity, and a way of mixing either a compound having a glycidyl group that incorporates a polar group and has a high relative permittivity, or an acid anhydride having a high relative permittivity.

In the present embodiment, the foregoing compound having the glycidyl group is at least one of a diglycidyl ester derivative compound and a diglycidyl ether derivative compound. At least one kind selected from diglycidyl phthalate and hexahydrodiglycidyl phthalate is preferably used as the diglycidyl ester derivative compound. At least one kind selected from glycerol polyglycidyl ether, 1,4-butanediol diglycidyl ether and bisphenol A diglycidyl ether is preferably used as the diglycidyl ether derivative compound.

In the present embodiment, the foregoing acid anhydride is a phthalic anhydride derivative compound. Examples of the phthalic anhydride derivative compound include 4-methyl hexahydrophthalic anhydride and hexahydrophthalic anhydride, and these may be mixed together for use. When one comprised of 4-methyl hexahydrophthalic anhydride and hexahydrophthalic anhydride is used as the phthalic anhydride derivative compound, the concentration of 4-methyl hexahydrophthalic anhydride is preferably higher than the concentration of hexahydrophthalic anhydride.

Examples of the high relative permittivity compound include mineral salts such as sodium hydrogen carbonate, and potassium chloride; compounds such as pyridine, quaternary ammonium, monoethanolamine, triethanolamine, diethylamine, and ethylene carbonate; polymerizable materials; and solvents such as water, acetonitrile, N,N-dimethylformamide, nitrobenzene, methanol, ethanol, acetone, isopropyl alcohol, ethylene glycol, glycerine, tetrahydrofuran, ethyl acetate, chloroform, dioxane, acrylonitrile, propylene carbonate, and dimethyl sulfoxide. These may be used by mixing one kind or two or more kinds of these. At least one kind selected from propylene carbonate and ethylene carbonate is preferably used as the high relative permittivity compound.

Examples of the polymerizable materials include vinyl-based monomers or oligomers, such as methyl (meth)acrylate, vinyl acetate, styrene, 2-hydroxyethyl (meth)acrylate, (meth)acrylate, 4-hydroxybutyl, methyl (meth)acrylate, and ethylene di(meth)acrylate; circular ethers such as ethylene oxide, trimethylene oxide, tetrahydrofuran, and tetrahydropyran; circular esters such as β-propiolactone; circular amides such as ε-caprolactam; and monomers that supply polysilane such as methyl silane and phenyl silane. These may be used by mixing one kind or two or more kinds of these.

The epoxy resin 2 can be identified through analysis using, for example, an "IR Prestige-21" as a Fourier transform infrared spectrometer manufactured by Shimadzu Corporation.

The content of the epoxy resin 2 is preferably 35-90% by mass to the sum of the epoxy resin composition 1. When the content of the epoxy resin 2 is 35% by mass or more, it is ensured to further improve visibility as a member that exhibits the play of color in a wide wavelength range composed mainly from violet to red. When the content of the epoxy resin 2 is 90% by mass or less, the electrostatic force 7 of the colloidal particles 3 is exerted between the colloidal particles 3 adjacent to each other, thus allowing the individual colloidal particles 3 to be regularly aligned. Accordingly, the visibility can be further improved as a member that exhibits the play of color composed mainly of the polycrystalline structure 6.

The adjustment of the relative permittivity of the epoxy resin 2 ensures adjustment of the content of silicon oxide that permits the formation of the monocrystalline structures 4 constituting the polycrystalline structure 6. That is, the degree of dissociation of hydroxyl group on the surface of the colloidal particles 3 is increased with increasing the relative permittivity of the epoxy resin 2, and the electric charge on the surfaces of the colloidal particles 3 is increased to enhance the electrostatic force 7, thereby increasing the distance in which the electrostatic force 7 is exerted. This ensures electrostatic repulsion even when the content of the silicon oxide is lowered. Consequently, it is estimated that even when the content of the silicon oxide is lowered, the colloidal particles 3 are regularly aligned to permit the formation of the monocrystalline structures 4.

The adjustment of the content of the silicon oxide ensures control of the size of the monocrystalline structures 4 constituting the polycrystalline structure 6. That is, by decreasing the content of the silicon oxide, namely, by increasing the distance between the colloidal particles 3 and 3 adjacent to each other, the monocrystalline structures 4 constituting the polycrystalline structure 6 can be made large to enhance the visibility of the polycrystalline structure 6.

Specifically, the size of the monocrystalline structure 4 is controlled to 0.1 mm or more, preferably 1-5 mm. The phrase "the size of the monocrystalline structures 4" denotes the diameter of the minimum circumscribed circle surrounding the monocrystalline structure 4 when viewed from the vertical direction with respect to the monocrystalline structure 4.

The adjustment of the relative permittivity, the adjustment of the content of the silicon oxide, and the addition of the high relative permittivity compound as described above may be performed alone or in combination.

On the other hand, the colloidal particles 3 of the present embodiment are comprised of silicon oxide and are dispersed in the epoxy resin 2. The colloidal particles 3 constitute the polycrystalline structure 6 as being present as, for example, (i) a mixture of monocrystallines of a body-centered cubic structure having different orientations; (ii) a mixture of monocrystallines of a face-centered cubic structure having different orientations; or (iii) a mixture of the monocrystallines of the body-centered cubic structure and the monocrystallines of the face-centered cubic structure.

Figures 3A, 3B:
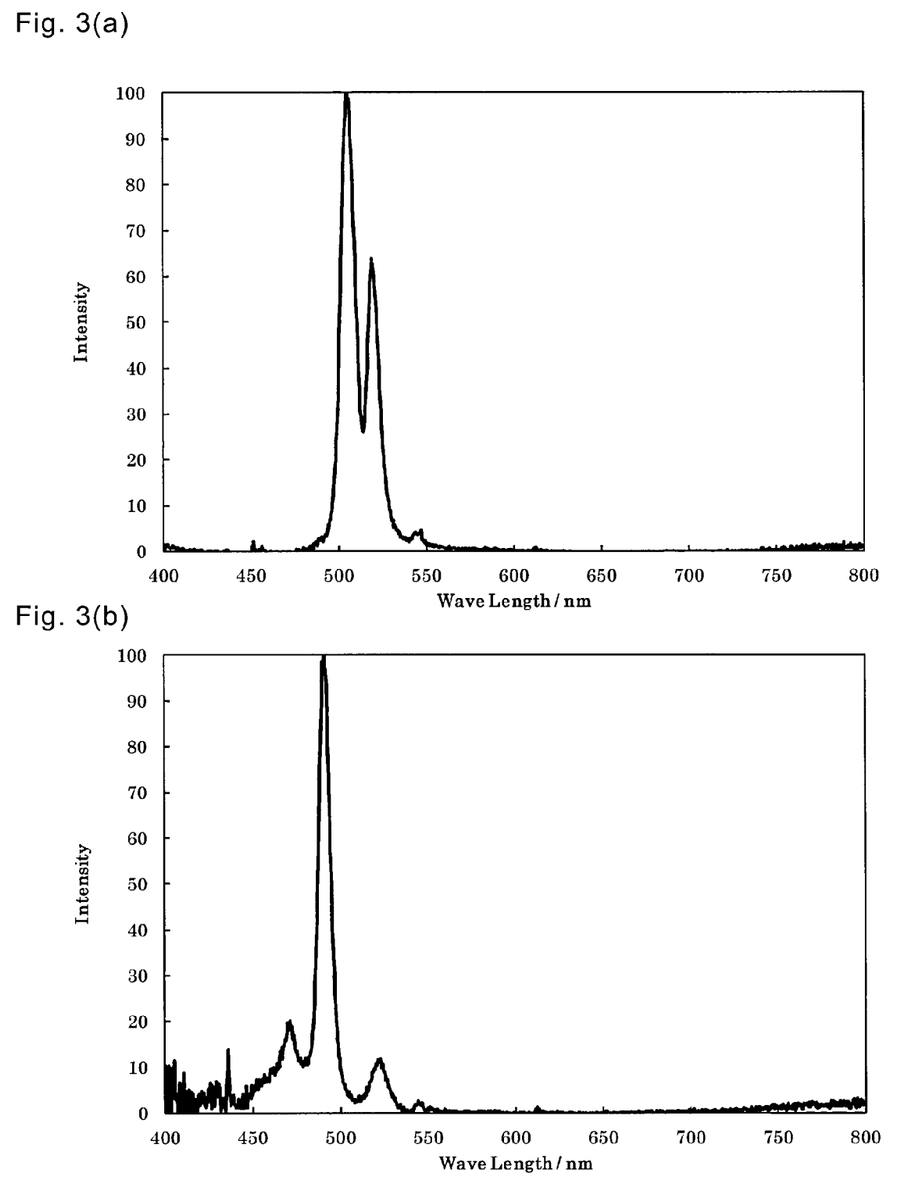

In the epoxy resin composition 1 of the present embodiment, as shown in FIGS. 3(a) and 3(b), a plurality of wavelength peaks are detected upon measurement of reflection spectrums because the monocrystalline structures 4 are present as a mixture. It can be seen that these reflection spectrums produce the sufficient play of color with which the color of reflected light changes with a change in viewing angle. The reflection spectrums are measurable by, for example, a fiber multichannel spectrometer "USB2000" manufactured by Ocean Optics. FIGS. 3(a) and 3(b) shows the reflection spectrums of the epoxy resin compositions in samples Nos. 13 and 14, respectively, in examples described later, which were measured by the "USB2000."

Further, a repulsive force acts between the colloidal particles 3 and 3 adjacent to each other by the electrostatic force 7. Hence in the present embodiment, the plurality of colloidal particles 3 and 3 are not contacted with each other as shown in FIG. 2(a). A mean distance L between the colloidal particles 3 and 3 adjacent to each other is kept less than 330 nm, preferably 140 nm or more and less than 330 nm, more preferably 150-300 nm, and still more preferably 160-290 nm.

In the case where the mean distance L between the colloidal particles 3 and 3 is 140 nm or more, when the refractive index of the sample is set to, for example, 1.5, a diffraction wavelength λ obtained depending on the mean distance L between the colloidal particles 3 and 3 is given by the expression: 2×1.5×2/61/2×140=343 nm according to the expression for Bragg reflection. Therefore, there is no possibility of being shorter than the wavelength of visible light. This ensures further improvement of visibility as a member that exhibits the play of color composed mainly of the polycrystalline structure 6.

In the case where the mean distance L between the colloidal particles 3 and 3 is less than 330 nm, there is no possibility that the diffraction wavelength λ obtained depending on the resulting crystal structure is longer than the wavelength of visible light. This also ensures further improvement of visibility as the member that exhibits the play of color composed mainly of the polycrystalline structure 6.

The mean distance L between the colloidal particles 3 and 3 can be controlled to a desired value by adjusting the concentration of the plurality of silicon oxide colloidal particles 3 in the epoxy resin composition 1, namely, the content of the silicon oxide. The content of the silicon oxide is 10-50% by mass, preferably 15-50% by mass, and still preferably 20-45% by mass to the sum of the epoxy resin composition 1. The increased content of the silicon oxide within the above range creates a tendency of decreasing the mean distance L between the colloidal particles 3 and 3. Reversely, the decreased content of the silicon oxide within the above range creates a tendency of increasing the mean distance L between the colloidal particles 3 and 3. That is, the content of the silicon oxide (the concentration of the plurality of silicon oxide colloidal particles 3) and the mean distance L between the colloidal particles 3 and 3 have a correlation. The content of the silicon oxide falling within the above range ensures that the electrostatic force 7 of the colloidal particles 3 is exerted between the colloidal particles 3 and 3 adjacent to each other so as to regularly align the individual colloidal particles 3. This ensures further improvement of visibility as the member that exhibits the play of color composed mainly of the polycrystalline structure 6.

The mean distance L between the colloidal particles 3 and 3 is measurable, for example, in the following manner. That is, the mean distance L is measurable in an SEM image (refer to FIG. 2(a)) obtained by observing a secondary electron composition image with respect to an optional fracture surface of the epoxy resin composition 1 at an acceleration voltage of 1 kV by using a scanning electron microscope (SEM) ("SU8000" manufactured by Hitachi High Technologies Corporation). More specifically, as shown in FIG. 3(b), the mean distance L between the colloidal particles 3 and 3 is measurable by selecting optional ten points to measure the distance from a center 3a of one of the colloidal particles 3 adjacent to each other to a center 3a of the other colloidal particle 3, and by calculating a mean value of the measured distances, and then converting the mean value according to the magnification on the SEM. A suitable magnification is about 10000-200000×.

The measurement of the content of the silicon oxide can be made by thermogravimetric analysis using a "DTG-60H" manufactured by Shimadzu Corporation. The identification of the silicon oxide can be performed by, for example, a fluorescent X-ray analysis using a "SEA1200VX" manufactured by SII Nano Technology Inc.

A mean particle size R of the plurality of colloidal particles 3 is less than 290 nm, preferably 70 nm or more and less than 290 nm, more preferably 85-250 nm, and still more preferably 100-235 nm. In the case where the mean particle size R of the colloidal particles 3 is 70 nm or more, there is no possibility that the diffraction wavelength is longer than the wavelength of visible light. This ensures further improvement of visibility as the member that exhibits the play of color composed mainly of the polycrystalline structure 6. Also in the case where the mean particle size R of the colloidal particles 3 is less than 290 nm, there is no possibility that the diffraction wavelength is longer than the wavelength of visible light. This ensures further improvement of visibility as the member that exhibits the play of color composed mainly of the polycrystalline structure 6.

The mean particle size R of the colloidal particles 3 is measurable with respect to powder by, for example, the foregoing SEM, and is measurable with respect to dispersion liquid by, for example, a particle size distribution measuring apparatus, such as a disk centrifugal type particle size distribution measuring apparatus "DC24000" manufactured by CPS Instruments, Inc. More specifically, in the case of measuring by the SEM, the mean particle size R may be found for the colloidal particles 3 observed in a 1 μm square field of view in the SEM photograph of FIG. 2(a). In the case of using the particle size distribution measuring apparatus, the mean particle size R of the colloidal particles 3 is found from a particle size distribution, thus requiring sufficient extraction to such a degree that the mean particle size R does not depend on the number of the colloidal particles.

The colloidal particles 3 can be prepared by a well-known method using water glass or silicon alkoxide as the material of the silicon oxide. Specific examples thereof include a method in which the silicon alkoxide is subjected to alkaline hydrolysis, and a method in which the colloidal particles 3 having an optional particle size are obtained by laminating silicon oxide using the water glass as a material.

The epoxy resin composition 1 of the present embodiment having the foregoing configuration has a relative permittivity of 4 or more. The relative permittivity of the epoxy resin composition 1 of the present embodiment is preferably 9 or less.

The epoxy resin composition 1 of the present embodiment having the foregoing configuration exhibits the play of color in the wavelength range from violet to red. Specifically, the epoxy resin composition 1 of the present embodiment exhibits the play of color owing to light in the wavelength range of 400-800 nm.

A method for producing the epoxy resin composition according to one embodiment of the present invention is described below by exemplifying the foregoing epoxy resin composition 1. The method for producing the epoxy resin composition according to the present embodiment includes the following first step and second step. The present embodiment is described in detail below in the order of the steps.

(First Step)

Firstly, at least one of a diglycidyl ester derivative compound and a diglycidyl ether derivative compound, a phthalic anhydride derivative compound, and a high relative permittivity compound are mixed together to obtain the foregoing blended material having a relative permittivity of 4 or more, preferably 4-10.

On the other hand, silicon oxide powder constituting the colloidal particles 3 of the epoxy resin composition 1 is prepared, for example, in the following manner. Firstly, a mixture of colloidal silica and alcohol is loaded into a container. Examples of the alcohol include methanol, ethanol, isopropyl alcohol, and 2-propanol. Examples of the material of the container include polypropylene.

Subsequently, the mixture is subjected to centrifugal separation into a solid composition and a liquid composition by a centrifugal separator. The centrifugal separation is preferably performed at a rotational speed of about 8000-10000 rpm for about 30-60 minutes.

After the centrifugal separation, supernatant liquid in the container is discarded, and the alcohol having an approximately equivalent amount to the amount of the discarded supernatant liquid is weighed out into the container.

Subsequently, after redispersion by ultrasonic waves, the solid composition and the liquid composition are separated again by the centrifugal separator. This step is repeated about 2 to 5 times. This facilitates the redispersion of silicon oxide powder to be obtained. When the separation is terminated, the solid composition is dried at temperatures of 35-60° C. to obtain the silicon oxide powder. The drying may be carried out in a vacuum state.

The mean particle size R of the obtained silicon oxide powder, namely, the silicon oxide colloidal particles 3 is less than 290 nm, preferably 70 nm or more and less than 290 nm, more preferably 85-250 nm, and still more preferably 100-235 nm. The silicon oxide colloidal particles 3 are added to and dispersed in the foregoing blended material so as to obtain a precursor. The dispersion is preferably carried out using an ultrasonic dispersion apparatus. As the conditions of the ultrasonic waves, frequency is preferably about 10-50 kHz, and time is preferably about 1-15 hours.

The concentration of the silicon oxide colloidal particles 3 in the precursor is 10-50% by mass, preferably 15-50% by mass, and more preferably 20-45% by mass.

(Second Step)

The foregoing precursor is heated to obtain the foregoing epoxy resin composition 1 in which a plurality of colloidal particles 3 and 3 are not contacted with each other and the mean distance L between the colloidal particles 3 and 3 adjacent to each other is less than 330 nm. Specifically, the silicon oxide powder is dispersed in the blended material and is then thermally polymerized to cure the precursor, thereby obtaining the epoxy resin composition 1 in which the polycrystalline structure 6 of the colloidal particles 3 is contained in the epoxy resin 2. As the heating conditions, heating temperature is preferably 60-150° C., and heating time is preferably 5-24 hours.

With the foregoing production method, the epoxy resin composition 1 can be usually produced in a relatively short term of about 1-3 days without requiring a long term for production as in the case of the conventional closest packing method. This is advantageous in terms of costs and is excellent in mass production.

As the foregoing silicon oxide powder, one in which the silicon oxide powder is coated with organic molecules may be used. This ensures to further enhance the affinity of the silicon oxide powder with respect to the polymerizable material. In this case, the mean particle size of the entirety including the organic molecules preferably falls within the foregoing range of the mean particle size R.

Examples of the organic molecules include homopolymers such as poly(methyl (meth)acrylate), polystyrene, and poly(maleic anhydride); copolymers obtained by copolymerizing methyl (meth)acrylate, styrene, maleic anhydride, or other copolymerizable monomers; compounds having a glycidyl group as a functional group; and polymers (homopolymers and copolymers) having a glycidyl group as a functional group. These may be used by mixing one kind or two or more kinds of these. These organic molecules may have a suitable functional group in order to further improve affinity with particle surfaces. Examples of the functional group include trimethoxysilane group and triethoxysilane group. The amount of the organic molecules that cover the surface of the silicon oxide powder is preferably, for example, about 1-20% by mass to the mass of a particle. Other configurations are similar to those in the foregoing epoxy resin composition 1, and their descriptions are omitted.

The epoxy resin composition 1 of the present embodiment is preferably produced by the foregoing production method. However, the production method thereof is not limited to the foregoing production method as long as the obtained epoxy resin composition 1 has the foregoing physical properties. For example, if a certain production method can produce the epoxy resin composition 1 so as to have the relative permittivity of 4 or more without using the high relative permittivity compound, this production method may be employed. The epoxy resin composition 1 is required to retain the relative permittivity of 4 or more until at least immediately after curing. That is, the relative permittivity may be changed after the curing due to the influence of moisture absorption or the like.

The epoxy resin composition 1 of the foregoing embodiment is suitable for composite members for use in, for example, building materials, ornaments, and optical materials. Examples of the building materials to which the epoxy resin composition 1 of the present embodiment is applicable include interior and exterior wall materials and flooring materials. Examples of the ornaments to which the epoxy resin composition 1 of the present embodiment is applicable include rings, necklaces, earrings, and brooches, each using jewelry that looks like opal. Examples of the optical materials to which the epoxy resin composition 1 of the present embodiment is applicable include photonic crystals for laser oscillators, and various optical filters.

The use of the epoxy resin composition 1 of the present embodiment is not limited to the foregoing building materials, ornaments and optical materials, but is suitably applicable to the fields in which it is required to exhibit optional play of color from the wide wavelength range from violet to red. Examples of other uses of the epoxy resin composition 1 of the present embodiment include radiant materials, such as paints or wrapping papers, clock faces, containers for cosmetics or the like, and writing implements.

The present invention is described in detail below by illustrating examples. However, the present invention is not limited to the following examples.

In the following examples, relative permittivity, the mean particle size R of the silicon oxide colloidal particles, the mean distance L between the silicon oxide colloidal particles adjacent to each other, and visibility were measured or evaluated in the following manner.

<Relative Permittivity>

Measurements of the relative permittivity of blended materials and epoxy resin compositions were made by the high-precision impedance/LCR meter "6430B" manufactured by Wayne Kerr Electronics.

<Mean Particle Size R of Silicon Oxide Colloidal Particles>

The mean particle size R of the silicon oxide colloidal particles was measured based on an SEM image. The SEM image was obtained by photographing an optional fracture surface of the epoxy resin composition by using the scanning electron microscope "SU8000" manufactured by Hitachi High Technologies Corporation at a magnification of 10000×. Then, optional ten points in the obtained SEM image were measured and a mean value thereof was calculated to obtain the mean particle size R.

<Mean Distance L Between Silicon Oxide Colloidal Particles Adjacent to Each Other>

The mean distance L between the silicon oxide colloidal particles adjacent to each other was measured based on an SEM image. The SEM image was obtained by photographing an optional fracture surface of the epoxy resin composition by using the scanning electron microscope "SU8000" manufactured by Hitachi High Technologies Corporation at a magnification of 10000×. Optional ten points in the obtained SEM image were measured. Thereafter, a mean value thereof was calculated, and the mean value is converted from the magnification, and the resulting value was used as the mean distance L.

<Visibility>

The obtained epoxy resin compositions were visually observed to evaluate the visibility of a polycrystalline structure. Specifically, the region where the range from violet to red was mainly recognizable was evaluated as the polycrystalline structure. Evaluation standards were set as follows.

Symbol ⊚ denotes the crystal having a large size and satisfactory visibility;

Symbol ○ denotes the crystal having a small size and satisfactory visibility; and Symbol x denotes poor visibility.

EXAMPLES

Production of Epoxy Resin Composition

Firstly, a blended material was produced. Compounds used for producing the blended material were as follows.

(Compound Having Glycidyl Group)
GPE: glycerol polyglycidyl ether
DP: diglycidyl phthalate
BDE: 1,4-butanediol diglycidyl ether
BADE: bisphenol A diglycidyl ether
DHP: diglycidyl hexahydrophthalate (Phthalic Anhydride Derivative Compound)

There was used a phthalic anhydride derivative compound comprised of 4-methyl hexahydrophthalic anhydride and hexahydrophthalic anhydride in which the mass ratio of 4-methyl hexahydrophthalic anhydride to hexahydrophthalic anhydride was 7:3.

(High Relative Permittivity Compound)
EC: ethylene carbonate
PC: propylene carbonate The foregoing individual compounds were mixed together in the proportion and combination presented in Table 1 to obtain the blended material having the relative permittivity presented in Table 1.

On the other hand, the silicon oxide colloidal particles having the mean particle size R presented in Table 1 were obtained in the following manner. Firstly, 250 g of colloidal silica and 250 g of methanol were respectively weighed out into a container made of polypropylene. This was subjected to centrifugal separation by a centrifugal separator at a rotational speed of 9100 rpm for one hour. Subsequently, supernatant liquid occurred in the container after the centrifugal separation was discarded, and methanol of an approximately equivalent amount to the amount of the discarded centrifugal separation was loaded into the container. This was again subjected to centrifugal separation using the centrifugal separator. This step was repeated three times. After the centrifugal separation, a solid composition was dried at a temperatures of 45° C. by a drier to obtain silicon oxide colloidal particles (silicon oxide powder) having the mean particle size presented in Table 1.

Subsequently, the obtained silicon oxide colloidal particles were added to and dispersed in the foregoing blended material at the concentration and in the combination presented in Table 1, thereby obtaining a precursor. The dispersion was carried out by irradiating ultrasonic waves having frequencies of 24 kHz for one hour by using an ultrasonic dispersion apparatus.

The obtained precursor was heated and cured by the dryer to obtain epoxy resin compositions corresponding to samples Nos. 1 to 17 respectively having the relative permittivity and the mean distance L presented in Table 1. The heating conditions were as follows.

(Heating Conditions)
Heating temperature: 130° C.
Heating time: five hours

<Evaluation>

The obtained epoxy resin compositions were evaluated in terms of visibility according to the foregoing manner. The results thereof are presented in Table 1.

TABLE 1

| | Precursor | | | | | | | | | Epoxy resin composition | | |
|---|---|---|---|---|---|---|---|---|---|---|---|---|
| | Blended material | | | | | | Silicon oxide colloidal particle | | | | | |
| | Composition having a glycidyl group | | Pphthalic anhydride derivative compound[3] | | High relative permittivity compound | | Relative permittivity | Mean particle size R | Concentration | Relative permittivity | Mean distance L (nm) | Effect Visibility |
| Sample No.[1] | Composition[2] | (% by mass) | (% by mass) | Composition[4] | (% by mass) | | | (nm) | (% by mass) | | | |
| *1 | GPE | 75 | 25 | — | — | 3 | 130 | 25 | 12 | 205 | X | |
| 2 | DP | 50 | 50 | — | — | 5 | 200 | 40 | 6 | 260 | ⊚ | |
| 3 | DP | 50 | 50 | — | — | 5 | 110 | 30 | 9 | 160 | ⊚ | |
| 4 | DP | 50 | 50 | — | — | 5 | 110 | 20 | 6 | 190 | ⊚ | |
| 5 | BDE | 39 | 61 | — | — | 7 | 130 | 25 | 5 | 205 | ⊚ | |
| 6 | BDE | 37 | 63 | — | — | 7 | 130 | 35 | 4 | 180 | ⊚ | |
| 7 | BADE | 50 | 50 | — | — | 6 | 130 | 30 | 7 | 190 | ⊚ | |
| *8 | DHP | 50 | 50 | — | — | 4 | 290 | 60 | 3 | 310 | X | |
| 9 | DHP | 50 | 50 | — | — | 4 | 130 | 30 | 6 | 190 | ⊚ | |
| *10 | DHP | 50 | 50 | — | — | 4 | 130 | 6.7 | 7 | 330 | X | |

TABLE 1-continued

| Sample No.[1] | Precursor | | | | | | | | | Effect Visibility |
|---|---|---|---|---|---|---|---|---|---|---|
| | Blended material | | | | | | Silicon oxide colloidal particle | | Epoxy resin composition | |
| | Composition having a glycidyl group | | Pphthalic anhydride derivative compound[3] | High relative permittivity compound | | Relative permittivity | Mean particle size R (nm) | Concentration (% by mass) | Relative permittivity | Mean distance L (nm) | |
| | Composition[2] | (% by mass) | (% by mass) | Composition[4] | (% by mass) | | | | | | |
| 11 | DHP | 50 | 50 | — | — | 4 | 100 | 20 | 6 | 170 | ◉ |
| 12 | DHP | 50 | 50 | — | — | 4 | 235 | 45 | 5 | 290 | ○ |
| 13 | DHP | 47 | 47 | EC | 6 | 10 | 130 | 25 | 4 | 205 | ◉ |
| 14 | DHP | 47 | 47 | EC | 6 | 10 | 130 | 30 | 4 | 190 | ◉ |
| 15 | DHP | 47 | 47 | EC | 6 | 10 | 150 | 30 | 4 | 220 | ◉ |
| 16 | DHP | 48 | 49 | PC | 3 | 7 | 130 | 25 | 4 | 205 | ◉ |
| 17 | DHP | 48 | 49 | PC | 3 | 7 | 150 | 30 | 4 | 220 | ◉ |

[1]Symbol "*" indicates that the sample is in the out of range of the present application.
[2]GPE: glycerol polyglycidyl ether, DP: diglycidyl phthalate, BDE: 1,4-butanediol diglycidyl ether BADE: bisphenol A diglycidyl ether, DHP: diglycidyl hexahydrophthalate
[3]4-methyl hexahydrophthalic anhydride:hexahydrophthalic anhydride = 7:3
[4]EC: ethylene carbonate, PC: propylene carbonate As can be seen from Table 1, all of the samples Nos. 2-7, 9, and 11-17 are excellent in visibility. On the contrary, in the sample No. 1, the relative permittivity of the blended material is less than 4. In the sample No. 8, the mean particle size R in the silicon oxide colloidal particles is not below 290 nm and the concentration thereof exceeds 50% by mass, and the relative permittivity of the epoxy resin composition is less than 4. In the sample No. 10, the concentration of the silicon oxide colloidal particles is less than 10% by mass, and the mean distance L is not below 330 nm. That is, these results indicate that all of the samples Nos. 1, 8 and 10 have poor visibility.

What is claimed is:

1. An epoxy resin composition comprising:
a polycrystalline structure comprising a plurality of monocrystalline structures, the plurality of monocrystalline structures comprising a plurality of silicon oxide colloidal particles regularly aligned in epoxy resin,
wherein the plurality of silicon oxide colloidal particles are not contacted with each other,
wherein a mean distance between the silicon oxide colloidal particles adjacent to each other is less than 330 nm,
wherein a mean particle size of the plurality of silicon oxide colloidal particles is less than 290 nm,
wherein a concentration of the plurality of silicon oxide colloidal particles is 10-50% by mass,
wherein a relative permittivity is equal to or more than 4, and
wherein the epoxy resin is obtained by curing a blended material obtained by mixing at least one of a diglycidyl ester derivative compound and a diglycidyl ether derivative compound, a phthalic anhydride derivative compound and a high relative permittivity compound, and having a relative permittivity equal to or more than 4,
wherein the high relative permittivity compound is at least one selected from propylene carbonate and ethylene carbonate.

2. The epoxy resin composition according to claim 1, wherein the relative permittivity of the epoxy resin composition is equal to or less than 9.

3. The epoxy resin composition according to claim 1, being configured to exhibit play of color owing to light having a wavelength range of 400-800 nm.

4. A building material using the epoxy resin composition according to claim 1.

5. An ornament using the epoxy resin composition according to claim 1.

6. An optical material using the epoxy resin composition according to claim 1.

7. The epoxy resin composition according to claim 1, wherein the high relative permittivity compound is ethylene carbonate.

8. A method for producing an epoxy resin composition, the method comprising:
a first step comprising
mixing at least one of a diglycidyl ester derivative compound and a diglycidyl ether derivative compound, and a phthalic anhydride derivative compound and a high relative permittivity compound so as to obtain a blended material having a relative permittivity equal to or more than 4, and
adding silicon oxide colloidal particles having a mean particle size of less than 290 nm to the blended material so as to obtain a precursor in which a concentration of the silicon oxide colloidal particles is 10-50% by mass; and
a second step comprising heating the precursor to obtain an epoxy resin composition in which the plurality of silicon oxide colloidal particles are not contacted with each other and a mean distance between the silicon oxide colloidal particles adjacent to each other is less than 330 nm, and
wherein the high relative permittivity compound is at least one selected from propylene carbonate and ethylene carbonate.

9. The method for producing an epoxy resin composition according to claim 8, wherein a relative permittivity of the blended material is equal to or less than 10.

10. The method for producing an epoxy resin composition according to claim 8,
wherein at least one kind selected from diglycidyl phthalate and hexahydrodiglycidyl phthalate is used as the diglycidyl ester derivative compound, and wherein at least one kind selected from glycerol polyglycidyl ether, 1,4-butanediol diglycidyl ether and bisphenol A diglycidyl ether is used as the diglycidyl ether derivative compound.

11. The method for producing an epoxy resin composition according to claim 8,
wherein one formed of 4-methyl hexahydrophthalic anhydride and hexahydrophthalic anhydride is used as the phthalic anhydride derivative compound, and a concentration of the 4-methyl hexahydrophthalic anhydride is higher than a concentration of the hexahydrophthalic anhydride.

12. The method for producing an epoxy resin composition according to claim 8, wherein the high relative permittivity compound is ethylene carbonate.

* * * * *